No. 693,948. Patented Feb. 25, 1902.
R. W. CAVENAUGH.
AUTOMATIC SMOKE PREVENTER.
(Application filed Nov. 24, 1899.)
(No Model.) 3 Sheets—Sheet 1.
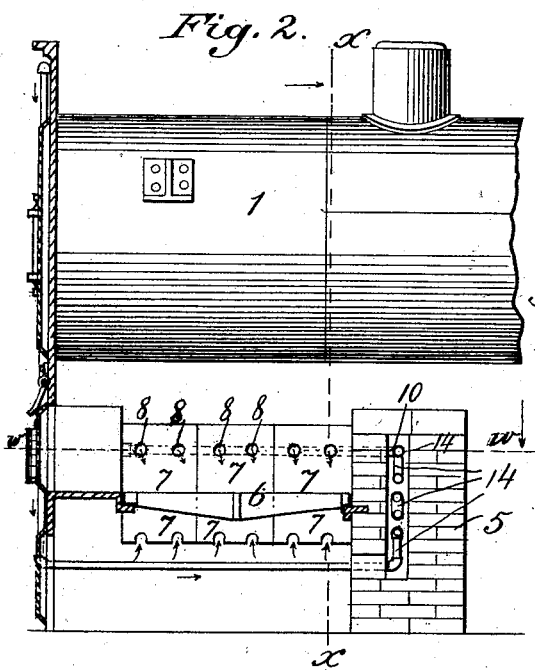
Fig. 2.
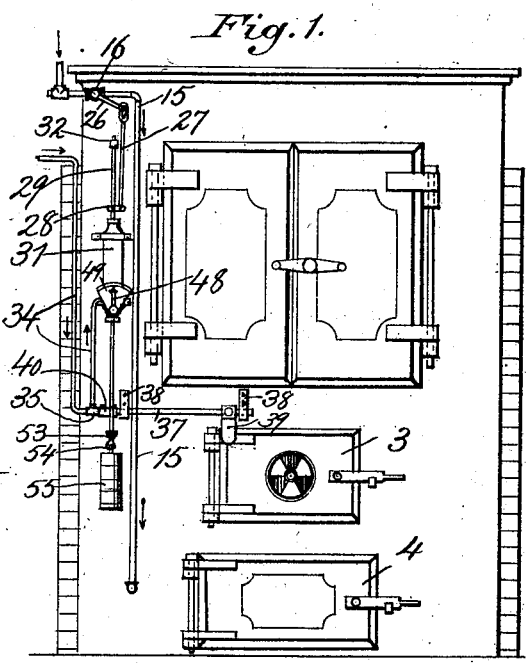
Fig. 1.
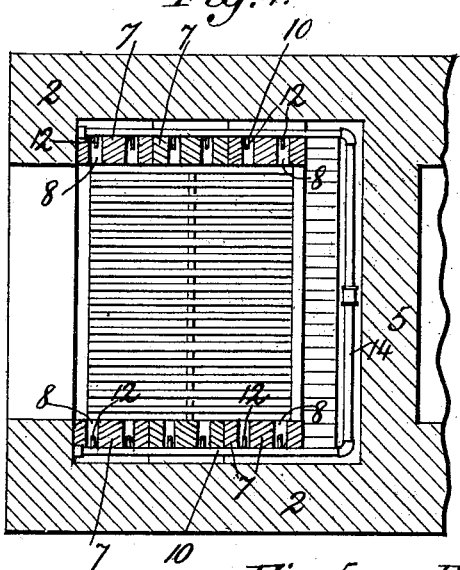
Fig. 4.
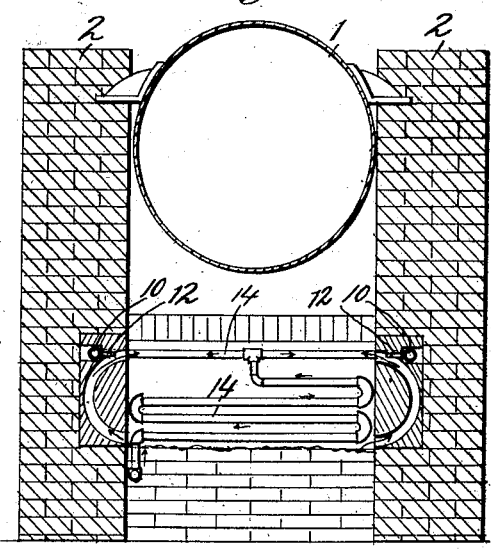
Fig. 3.
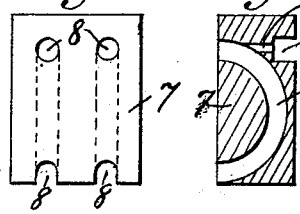
Fig. 5. Fig. 6. Fig. 7.
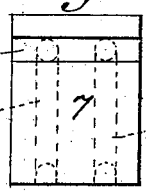
Witnesses
F. H. Schott
Chester A. Baker
Inventor
Ralph W. Cavenaugh
by his Attorney No. 693,948. Patented Feb. 25, 1902.
R. W. CAVENAUGH.
AUTOMATIC SMOKE PREVENTER.
(Application filed Nov. 24, 1899.)
(No Model.) 3 Sheets—Sheet 2.
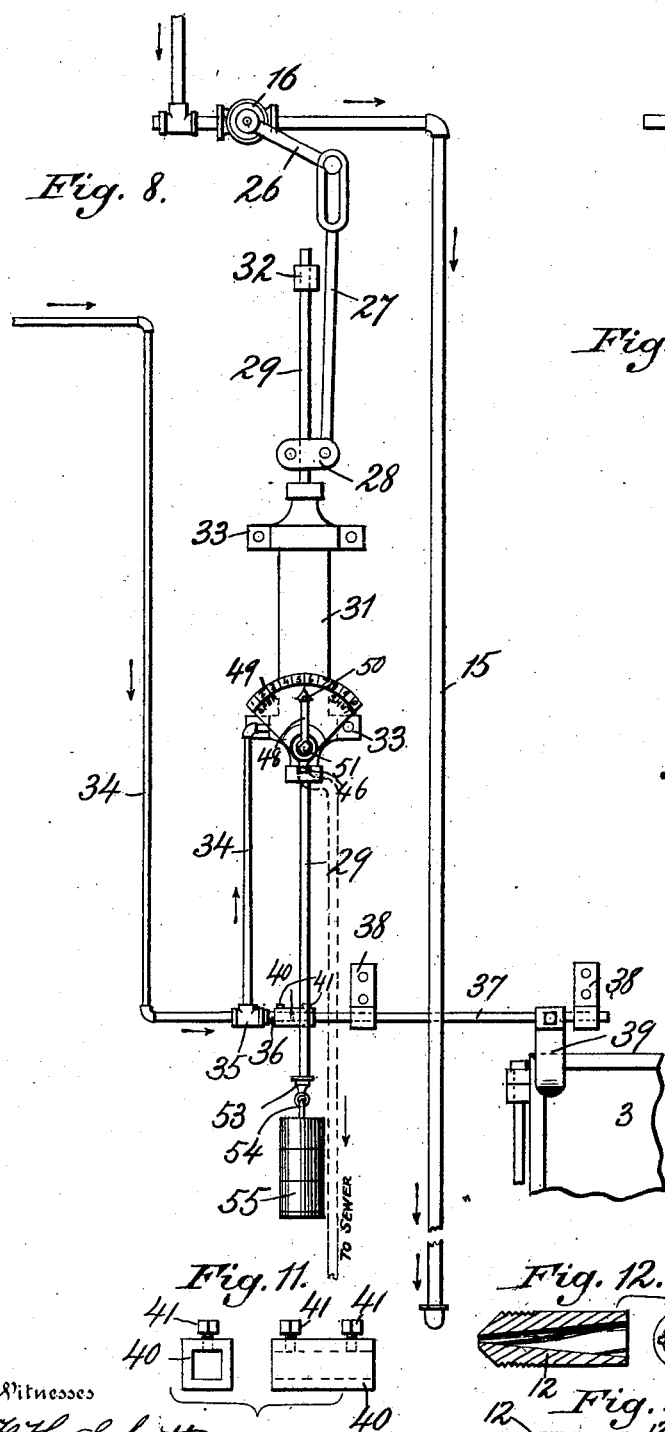
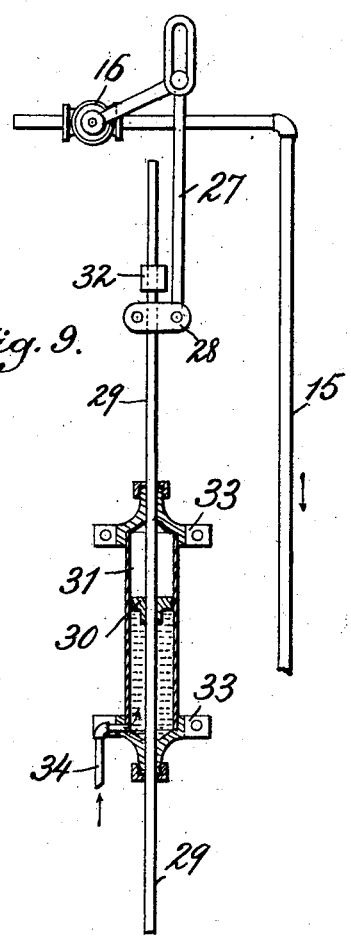
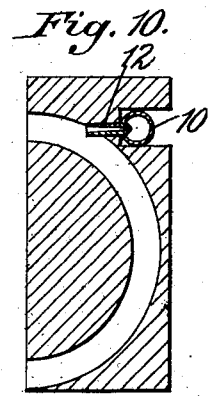
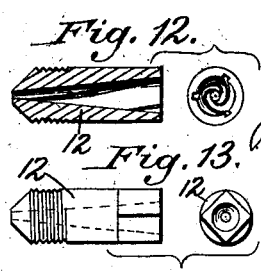
Witnesses
F. H. Schott
Chester A. Baker
Inventor
Ralph W. Cavenaugh
by his Attorney No. 693,948. Patented Feb. 25, 1902.
R. W. CAVENAUGH.
AUTOMATIC SMOKE PREVENTER.
(Application filed Nov. 24, 1899.)
(No Model.) 3 Sheets—Sheet 3.
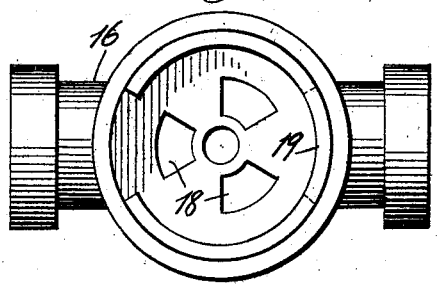
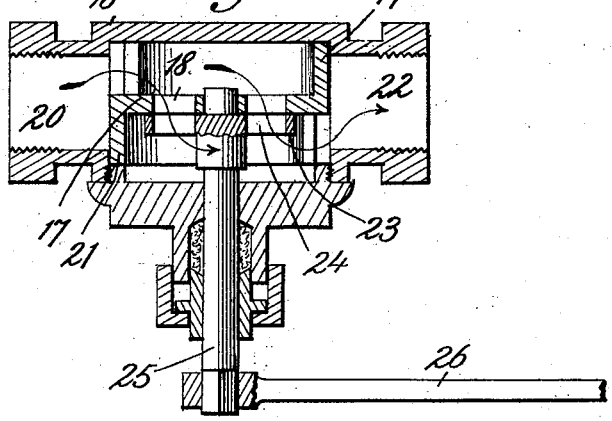
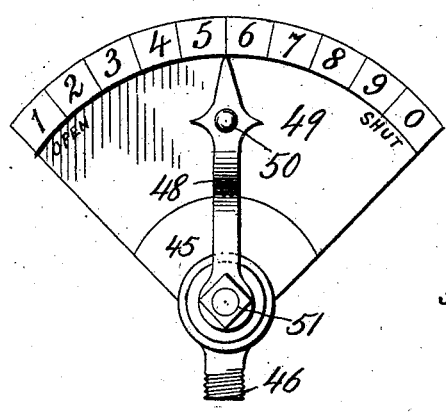
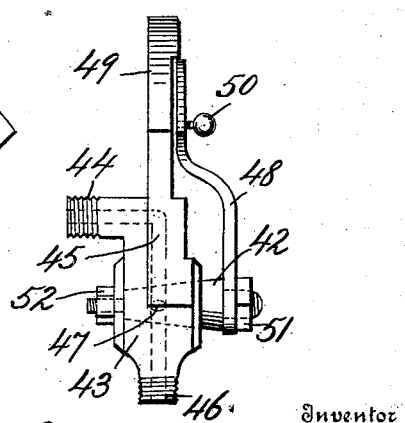
Witnesses
F. H. Schott
Chester A. Baker
Inventor
Ralph W. Cavenaugh,
by his Attorney

UNITED STATES PATENT OFFICE.

RALPH WAGGETT CAVENAUGH, OF ST. PAUL, MINNESOTA.

AUTOMATIC SMOKE-PREVENTER.

SPECIFICATION forming part of Letters Patent No. 693,948, dated February 25, 1902.

Application filed November 24, 1899. Serial No. 738,197. (No model.)

*To all whom it may concern:*

Be it known that I, RALPH WAGGETT CAVENAUGH, a citizen of the United States, residing at St. Paul, in the county of Ramsey and State of Minnesota, have invented certain new and useful Improvements in Automatic Smoke-Preventers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to automatic smoke-preventers for furnaces and is adaptable to stationary, marine, or locomotive boiler furnaces; and it has for its object to provide improved means for effecting the complete combustion of the fuel, so that the formation of smoke will be prevented.

It has, further, for its object to provide improved means for automatically controlling the supply of steam or air to the combustion-chamber and for accurately determining and effecting the period of time for supplying the steam or air to the combustion-chamber.

It has, further, for its object to provide an improved construction whereby the heated air may be drawn from beneath the furnace-grate and discharged above the fuel on the grate.

It has, further, for its object to provide improved features of construction in various parts of the apparatus whereby improved results are obtained in an automatic smoke-preventer appliance for furnaces.

To the accomplishment of the foregoing and such other objects as may hereinafter appear the invention consists in the construction and also in the combination of parts hereinafter particularly described and then sought to be specifically defined by the claims, reference being had to the accompanying drawings, forming a part hereof, and in which—

Figure 1 is a front elevation of a stationary-boiler furnace with my invention applied thereto. Fig. 2 is a longitudinal sectional elevation of such a furnace, illustrating the arrangement of the fire-tile through which air is taken from beneath the grate and discharged above the grate. Fig. 3 is a transverse vertical section on the line *x x* of Fig. 2. Fig. 4 is a horizontal section on the line *w w* of Fig. 2. Fig. 5 is a front view of the improved fire-tile. Fig. 6 is a vertical cross-section through the same. Fig. 7 is a side view of the same looking from the rear of the tile. Fig. 8 is a side elevation of the automatic device for governing the supply of steam or air to the combustion-chamber from an outside source. Fig. 9 is a side elevation of a portion of the automatic device for governing the supply of steam or air, the piston-cylinder and piston being in section and showing the parts in position for admitting steam or air from the outside source. Fig. 10 is a vertical cross-section through one of the fire-tile on an enlarged scale and showing the position of the steam-injector and pipe therein. Fig. 11 is an end and also a side view of a coupling; Fig. 12, a longitudinal section through the steam-jet. Fig. 13 is a side and also an end view of the steam-jet. Fig. 14 is a plan view of the seat of the improved valve. Fig. 15 is a horizontal section through the improved valve. Fig. 16 is a front view of the time-regulator for controlling the length of time that the steam or air from an outside source may be delivered to the combustion-chamber, and Fig. 17 is an end view of the time-regulator.

In the drawings, numeral 1 designates a boiler, of any suitable construction, which is set in suitable masonry 2. The front of the boiler-setting, which may be of cast-iron in the usual way, is provided with a fire-door 3 and a suitable ash-door 4. The furnace is also provided with a suitable bridge-wall 5 and a grate 6. The wall of the furnace at each side of the grate is provided with fire-tiles 7, of which there may be any desired number, according to the length of the grate. Each fire-tile is formed with one or more passages 8, which at their lower ends will open into the ash-pit beneath the grate and at their upper ends will open into the combustion-chamber above the grate and at such point as to lie above the fuel on the grate. These passages 8 curve from the lower ends to the upper ends and are made substantially in the form of a segment of a circle, thereby forming a semicircular passage-way or channel, so as to give the least possible resistance to the free passage of air, and thus reduce the friction to the minimum in the passage of air from beneath to above the grate. These fire-tiles are also formed in the rear upper faces with transverse channels 9, adapted to receive steam-pipes 10, from which will project steam jets or nipples 12, which will lie in openings 13, formed in the fire-tile, so that steam may be projected through the nipples and into the upper part of the curved channels 8, thus creating a strong suction through the channels 8, so as to draw the heated air from beneath the grate and impel the same, together with the steam issuing from the jets, into the combustion-chamber across the fuel on the grate, so as to supply the gases from the fuel with sufficient oxygen from the heated air and steam as will produce thorough and complete combustion, and thus prevent the formation and escape of soot and smoke. For the purpose of obtaining the best diffusion of the steam the steam-passage in the nipples is made conical in shape, (and may be rifled, as shown in Fig. 12,) with the largest area toward the discharge end of the nipple, thus allowing the steam to gradually expand in its passage through the nipple, and thus giving the best results. The steam for the pipes 10 enters the same from a superheating-coil 14, which is located in the bridge-wall 5 and is received from the boiler or other source of supply through the supply-pipe 15, it being superheated in the coil 14 before its passage into the nipple supply-pipes 10.

As it is only necessary to supply the heated air and steam to the furnace for a short time after the addition of a fresh supply of fuel, I provide means for automatically governing the supply of steam and for cutting off the supply after its purpose has been served. For that purpose the supply-pipe 15 is provided with a valve which is automatically opened upon opening the fire-door 3, which valve is closed after the fuel has been supplied and when the steam and heated air have performed their work, this cutting off of the steam being effected automatically. The valve referred to is illustrated in detail in Figs. 14 and 15 of the drawings, and it consists of the valve-casing 16, which is provided with a partition 17, having openings 18 and constituting the valve-seat, said partition having a flange or rim 19 on one side, which is cut away opposite the inlet 20, and with a flange or rim 21 on the opposite side, which is cut away opposite the outlet 22. Against one face of the partition 17 is fitted the rotary disk or member 23 of the valve, which has openings 24 registering with the openings 18 in the partition, and from which disk extends the valve-stem 25, which may be suitably packed, as illustrated in Fig. 15 of the drawings. The advantage of this construction of valve is the short radius required to operate it, although it has other advantages, which are obvious from the details illustrated. The stem 25 of this valve is provided with a crank or arm 26, which connects with a link 27, having its end slotted where the pin of the crank-arm 26 connects with it and having its other end pivotally connected with a bracket 28, which is adjustably connected by a clip or otherwise to the upper portion of a piston-rod 29 of a piston 30 in a cylinder 31, the upper end of the piston-rod 29 passing through a stationary guide sleeve or collar 32, which may be attached to the front plate of the furnace. The cylinder 31, which may be attached to the front plate of the furnace by suitable brackets 33, is supplied with a pressure or actuating agent through a pipe 34, which pipe may connect with the city water system if water be the pressure or actuating agent employed. The pipe 34 will be provided with a valve located at the point 35 or other suitable point for the purpose of controlling the passage of the pressure agent to the cylinder 31 through the pipe 34. The stem 36 of this valve will be connected by a suitable coupling with a rock-shaft 37, which may be supported from the front plate of the furnace by suitable brackets 38, which rock-shaft will carry a flap or arm 39, which will lie in the path of movement of the fire-door 3, so that when the door is opened it will contact with said flap or arm and rock the shaft 37, so as to turn the valve in the pipe 34, and thus admit the pressure agent into the cylinder 31 against one side of the piston 30, and thus move the latter so that through the piston-rod the valve in the steam-supply pipe will be opened to permit the passage of steam to the combustion-chamber through the pipe 15 and the superheating-coil 14 and the steam-jet pipe. The rock-shaft 37 will be provided with suitable means which will cause it to close the valve in the pipe 34 automatically, which means may be the flap or arm 39, the weight of which will tend to restore the rock-shaft to its normal position when the fire-door is closed, and thus the valve in the pipe 34 will be closed in the opening and closing of the fire-door. The preferred coupling for joining the valve-stem of the rock-shaft is illustrated in Fig. 11 of the drawings and consists of an extended sleeve 40, adapted to receive one end of the rock-shaft and also the end of the valve-stem and the interior of which is preferably angular in cross-section, as illustrated, so as to conform to the shape of the valve-stem and end of the rock-shaft in cross-section, said coupling-sleeve 40 being provided with set-screws 41, one of which will bite against the rock-shaft and the other against the valve-stem, thus securely joining the rock-shaft and valve-stem together. Under this construction the position of the rock-shaft in relation to the valve-stem can be adjusted and yet the two parts be securely coupled by the coupling-sleeve mentioned. By adjustably connecting the link-rod 27 to the piston-rod 29, as hereinbefore described, the point of connection between the two may be readily shifted or adjusted, so as to regulate the amount of throw of the valve to the steam-pipe 15 and also regulate the time when the valve shall be operated by the movement of the piston and its rod.

The length of time that it shall take to close the valve in the steam-pipe 15, and hence the period of time during which the steam shall be injected into the combustion-chamber, is controlled by the length of time which it shall take for the pressure agent to escape from the cylinder. This period is governed by the valve 42, which controls the outflow of the pressure agent from the cylinder 31. In order that this valve may accurately in time control the outflow of the agent for the period predetermined, which may be varied according to the fuel used in the furnace and as other conditions may require, I have devised the construction illustrated in detail in Figs. 16 and 17 of the drawings, and which for convenience and conciseness I will designate as a "time-regulator" and the preferred construction of which I will now describe. It consists, preferably, of a casting 43, which preferably is made of brass and which has a threaded nipple 44, which will be screwed into the lower part of the cylinder 31 and in which casting is a port 45, leading from the cylinder 31 to a second nipple 46 of the casting, to which last nipple may be connected a pipe (shown by dotted lines in Fig. 8) which will lead to the point of final discharge, which may be a sewer. The valve 42, which is shown and preferably is of the plug type, but may be of other form, is fitted in the casting 43 and is provided with a port 47, adapted to be brought into register with the port 45, which valve will control the outflow of the pressure agent, and by the adjustment of this valve a longer or a shorter time may be fixed as the period required for the escape of the pressure agent, and thus the time during which the steam shall be injected into the combustion-chamber is controlled, it being understood that steam will pass into the combustion-chamber so long as the valve in the pipe 15 is open. The tapering plug-valve 42 is provided with an index-finger 48, adapted to be moved over a scale 49, which is illustrated as formed as a part of the casting 43. This scale is provided with the desired number of numerals—for instance, as illustrated, with the numerals "1" to "10"—the spaces of which may represent so many minutes—that is, each space may represent on minute of time—so that if the pointer be moved to the extreme left and opposite the numeral "1" it will indicate that the port of the controlling-valve 42 is in such position that the cylinder 31 will be discharged of its contents in one minute of time, and hence the steam would be injected into the combustion-chamber for only that period. If it be desirable to have the steam injected into the chamber for a period of five minutes or longer, the index-finger will be moved opposite to the numeral designating the period and the plug-valve will be correspondingly adjusted, so that the steam will be injected for the predetermined period and no longer. It will thus be seen that by providing this time-regulator the outlet-valve can be so adjusted with exactness that the steam will be injected for a predetermined period. This time-regulator has been found in practice to be a very useful adjunct to the apparatus in providing for feeding the steam to the combustion-chamber for the predetermined period with absolute accuracy. The index-finger may be provided with a finger-stud 50, screwed into the index-finger, by which to operate the latter, although the same is not essential. The index-finger is held to the plug by the nut 51, and the plug is held in its seat by the nut 52. Such are the preferred details of construction of this time-regulator; but parts of it may be changed and essential features of the same be retained.

It may be added that the piston-rod 29 extends through the lower head of the cylinder 31 and at its lower end has a ring or eyelet 53 screwed thereon, from which is suspended a rod 54, designed to receive any desired number of weights 55.

I have described steam as being taken through the pipe 15 from a suitable source of supply and delivered to the combustion-chamber; but the several parts described will operate in the manner set forth if instead of passing steam through the pipe 15 said pipe is made to lead from a source of compressed-air supply, in which event compressed air instead of steam would be supplied to the combustion-chamber, and in that way the necessary oxygen for effecting complete combustion would be supplied.

I have illustrated and described with particularity the details of construction and arrangement of the several parts which I have found in actual practice to give most satisfactory results; but it is obvious that some changes can be made and yet the essential features of my invention be retained.

Having described my invention and set forth its merits, what I claim is—

1. The combination, with a suitable furnace, of a series of separate tiles arranged along the wall of the furnace and extended above and below the furnace-grate, said tiles having formed in their body between the front and rear faces thereof channels describing substantially an arc of a circle and opening at their lower ends below the grate and at their upper ends above the grate and having transverse grooves formed in the upper portion of their rear faces and with openings between said transverse grooves and said channels, said transverse grooves being adapted to receive a steam-pipe and said openings adapted to receive steam-jet nozzles extending from said steam-pipe so as to inject steam into said arc-shaped channels, substantially as described.

2. In a furnace smoke-preventer, the combination of a pipe leading to the fire-box from a source of supply, a valve in said pipe, said valve comprising a casing having open ends in communication with said pipe, an apertured vertically-disposed partition and an apertured member bearing against said partition and having a stem extending through the side of the casing between its opposite ends, a pressure-cylinder containing a piston and having a vertically-moving piston-rod, means connecting the piston-rod with the stem of the valve-apertured member to impart a rotary movement to said member in the reciprocation of the piston-rod, a pressure-supply pipe communicating with said cylinder, a valve in said pipe, a rock-shaft connected with the said valve to move it in both directions and having a member arranged in the path of movement of the furnace-door so as to turn the valve in the cylinder pressure-supply pipe when the door is open, and means for regulating the escape of the pressure agent from the pressure-cylinder, substantially as described.

3. In a smoke-preventer, the combination of a pipe leading to the fire-box from a source of supply, a valve in said pipe, said valve comprising a casing having open ends in communication with said pipe, an apertured vertically-disposed partition and an apertured member bearing against said partition and having a stem extending through the side of the casing between its opposite ends, a pressure-cylinder below said valve and provided with a piston having a vertically-movable piston-rod extending through the cylinder-head, a vertically-extending link connecting said piston-rod with said valve-stem, a pipe connecting with said cylinder for supplying a pressure agent to act on said piston, a valve controlling the supply of the pressure agent through the cylinder, means connecting the said valve operatively with the furnace-door whereby said valve will be opened by the opening of the furnace-door, and means for the escape of the pressure agent from the cylinder, substantially as described.

4. In a furnace smoke-preventer, the combination with a pipe leading to the fire-box from a source of supply and provided with a valve comprising a casing having open ends in communication with said pipe, a vertically-disposed apertured partition and an apertured member bearing against said partition and having a stem extending through the side of the casing between its opposite ends and provided with an arm, a pressure-cylinder containing a piston having a rod moving vertically through the cylinder-head, a vertically-arranged link pivotally connected with said piston-rod at one end and at the opposite end having a sliding connection with the arm of said valve-stem, a pressure-supply pipe communicating with said cylinder and provided with a valve, and mechanism operatively connecting said valve with the furnace-door whereby said valve is opened and closed in the movement of said door, substantially as described.

5. In a furnace smoke-preventer, the combination of a pipe leading to the fire-box from a source of supply, a valve in said pipe, a pressure-cylinder provided with a piston and its rod, means connecting the piston with said valve, a pipe connecting with said cylinder for supplying a pressure agent to act on said piston, a valve controlling the supply of the pressure agent to the cylinder, means connecting said valve operatively with the furnace-door, and means for the escape of the pressure agent from the cylinder, and means for predetermining and fixing the period of time for movement of the valve in the pipe leading to the fire-box, said means comprising a valve, a dial and an index-finger located at the discharge from the pressure-cylinder, the dial being so graduated as to time period and relatively to the pressure-cylinder discharge-valve port that upon the adjustment of the index-finger to a given point on the dial-scale the valve in the pipe leading to the fire-box will move for the period of time indicated on the scale-dial by the index-finger, substantially as described.

6. In a furnace smoke-preventer, the combination of a pipe leading to the fire-box from a source of supply, a valve in said pipe, a pressure-cylinder provided with a piston having a connection with said valve, a pipe leading to the said cylinder for supplying a pressure agent to act on said piston, a valve controlling the supply of the pressure agent to the cylinder, means connecting said valve operatively with the furnace-door, a valve for controlling the escape of the pressure agent from the cylinder, and a time-regulator index for predetermining and fixing the period of time for movement of the valve in the pipe leading to the fire-box, said index having a part thereof connected with the valve of the pressure-cylinder to adjust the valve, the index being provided with a scale graduated as to time period and relatively to the pressure-cylinder discharge-valve port that upon the adjustment of the pressure-cylinder discharge-valve to a given point indicated by the index-scale, the valve in the pipe leading to the fire-box will move for the period of time indicated by the given point on the index-scale, substantially as described.

7. In a furnace smoke-preventer, the combination of a pipe leading to the fire-box from a source of supply, a valve in said pipe, a pressure-cylinder provided with a piston having a connection with said valve, a pipe leading to said cylinder for supplying a pressure agent to act on said cylinder, a valve controlling the supply of the pressure agent to the cylinder, means connecting said valve operatively with the furnace-door, and means for predetermining and fixing the period of time for movement of the valve in the pipe leading to the fire-box, said means comprising a casting formed with a dial and provided with a valve carrying an index-finger and located at the discharge to the pressure-cylinder, said casting being formed with a port registering with a port in its valve and provided with means for its attachment to the pressure-cylinder, the dial of the casting being so graduated as to time period and relatively to the pressure-cylinder discharge-valve port that upon adjustment of the index-finger to a given point on the dial-scale the valve in the pipe leading to the fire-box will move for the period of time indicated on the scale-dial by the index-finger, substantially as described.

In testimony whereof I affix my signature in presence of two witnesses.

RALPH WAGGETT CAVENAUGH.

Witnesses:
J. KILSHAW,
B. A. DANIEL.